(12) United States Patent
Park et al.

(10) Patent No.: US 9,578,537 B2
(45) Date of Patent: Feb. 21, 2017

(54) METHODS AND ARRANGEMENTS FOR CHANNEL ACCESS IN WIRELESS NETWORKS

(75) Inventors: Minyoung Park, Portland, OR (US);
Eldad Perahia, Portland, OR (US);
Thomas J. Kenney, Portland, OR (US);
Emily H. Qi, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/977,701

(22) PCT Filed: Dec. 30, 2011

(86) PCT No.: PCT/US2011/068256
§ 371 (c)(1),
(2), (4) Date: Apr. 2, 2014

(87) PCT Pub. No.: WO2013/036275
PCT Pub. Date: Mar. 14, 2013

(65) Prior Publication Data
US 2014/0204837 A1 Jul. 24, 2014

Related U.S. Application Data

(60) Provisional application No. 61/531,273, filed on Sep. 6, 2011.

(51) Int. Cl.
*H04W 28/02* (2009.01)
*H04W 52/02* (2009.01)
(Continued)

(52) U.S. Cl.
CPC .......... *H04W 28/02* (2013.01); *H04L 27/2613* (2013.01); *H04L 27/2666* (2013.01); *H04W 52/0229* (2013.01); *H04W 88/02* (2013.01)

(58) Field of Classification Search
CPC ............. H04W 28/02; H04W 52/0225; H04W 52/0229; H04W 88/02; H04W 88/04; H04W 88/06
(Continued)

(56) References Cited

U.S. PATENT DOCUMENTS 7,957,335 B2 6/2011 Durazzo et al.
2006/0256709 A1 11/2006 Yang
(Continued)

FOREIGN PATENT DOCUMENTS

CA 2773663 A1 3/2011
CN 103828468 A 5/2014
(Continued)

OTHER PUBLICATIONS

Extended European Search Report received for EP Patent Application No. 11871942.6, mailed on Jun. 26, 2015, 7 pages.
(Continued)

*Primary Examiner* — Feben M Haile
(74) *Attorney, Agent, or Firm* — Schubert Law Group PLLC (57) ABSTRACT

Some embodiments provide a normal rate preamble detector to detect a signal transmitted in accordance with a first set of modulation and coding schemes and a low rate preamble detector to detect a signal transmitted in accordance with a second set of modulation and coding schemes. Embodiments may comprise channel traffic logic to determine a traffic indicator indicative of traffic on a communications channel. In many embodiments, channel traffic logic may comprise logic to determine a duty cycle of communications to determine the traffic indicator for the channel. In several embodiments, channel traffic logic may comprise logic to determine channel occupancy to determine the traffic indicator. Based upon the traffic indicator, channel traffic logic
(Continued)

may determine whether to disable the low rate preamble detector. Further embodiments comprise logic to design a station, determining whether to include a low rate preamble detector based upon parameters related to channel traffic.

25 Claims, 4 Drawing Sheets (51) Int. Cl.
*H04L 27/26* (2006.01)
*H04W 88/02* (2009.01)
(58) Field of Classification Search
USPC .................................. 370/252, 328, 329
See application file for complete search history.

(56) References Cited

U.S. PATENT DOCUMENTS

| | | |
|---|---|---|
| 2006/0269024 A1 | 11/2006 | Dominique et al. |
| 2007/0153761 A1 | 7/2007 | Fechtel |
| 2009/0103564 A1 | 4/2009 | Lee et al. |
| 2010/0246724 A1 | 9/2010 | Park |
| 2010/0331056 A1 | 12/2010 | Taghavi Nasrabadi et al. |
| 2011/0310880 A1 | 12/2011 | Nieto et al. |
| 2012/0294294 A1 | 11/2012 | Zhang |
| 2013/0051260 A1* | 2/2013 | Liu ............................. 370/252 |
| 2013/0201965 A1* | 8/2013 | Schmidl ............. H04L 27/2613 370/336 |
| 2015/0036567 A1 | 2/2015 | Park et al. |

FOREIGN PATENT DOCUMENTS

| | | |
|---|---|---|
| EP | 1 396 959 A2 | 10/2004 |
| JP | 10164157 A | 6/1998 |
| JP | 2010-154143 A | 7/2010 |
| JP | 2012-531827 A | 12/2012 |
| JP | 2014-525714 A | 9/2014 |
| JP | 2014-529224 A | 10/2014 |
| WO | 2005018180 A1 | 2/2005 |
| WO | 2009074949 A2 | 6/2009 |
| WO | 2013009347 A1 | 1/2013 |
| WO | 2013/028216 A1 | 2/2013 |
| WO | 2013/036275 A1 | 3/2013 |

OTHER PUBLICATIONS

Office Action received for Japanese Patent Application No. 2014-529702, mailed on Feb. 24, 2015, 4 pages of English Translation and 4 pages of Japanese Office Action.
Notice of Allowance received for Korean Patent Application No. 2014-7009074, mailed on Aug. 27, 2015, 1 page of English Translation and 2 pages of Korean Office Action.
Office Action received for Korean Patent Application No. 2014-7009074, mailed on Mar. 26, 2015, 4 pages of English Translation and 5 pages of Korean Office Action.
International Preliminary Report on Patentability and Written Opinion received for PCT Patent Application No. PCT/US2011/068256, mailed on Mar. 20, 2014, 6 pages.
International Search Report and Written Opinion received for PCT Patent Application No. PCT/US2011/068256, mailed on May 29, 2012, 9 pages.
Shin, et al., "Cascaded Clear Channel Assessment: Enhanced Carrier Sensing for Cognitive Radios", Proceedings of the 2007 IEEE International Conference on Communications (ICC 2007), XP031126714, Jun. 24-28, 2007, pp. 6532-6537.
Webster, et al., "Proposal for a High Speed PHY for the 2.4 GHz band", Submission to: IEEE P802.11, Wireless LANS, Harris Semiconductor, IEEE, XP055196864, Jan. 1998, 93 pages.
International Application Serial No. PCT/US2011/067886, International Search Report mailed May 30, 2012, 3 pages.
International Application Serial No. PCT/US2011/067886, Written Opinion mailed May 30, 2012, 4 pages.
European Application No. 11869365.4, Extended European Search Report mailed on Feb. 23, 2015, 7 pages.
International Application Serial No. PCT/US2011/067886, International Preliminary Report on Patentability mailed Jan. 23, 2014, 6 pages.

\* cited by examiner

METHODS AND ARRANGEMENTS FOR CHANNEL ACCESS IN WIRELESS NETWORKS

BACKGROUND

Embodiments are in the field of wireless communications. More particularly, embodiments are in the field of communications between wireless transmitters and receivers.

DETAILED DESCRIPTION OF EMBODIMENTS

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments provide a normal rate preamble detector for detecting and decoding preambles of a communications signal transmitted in, accordance with a first set of modulation and coding schemes and a low rate preamble detector for detecting and decoding preambles of a communications signal transmitted in accordance with a second set of lower rate modulation and coding schemes. Embodiments may further comprise channel traffic logic to determine a traffic indicator indicative of traffic on a communications channel upon which the communications signals are transmitted. In many embodiments, the channel traffic logic may comprise logic to determine a duty cycle of traffic transmitted by a transmitter to determine the traffic indicator. In several embodiments, the channel traffic logic may comprise logic to determine channel occupancy of the communications channel to determine the traffic indicator. Based upon the traffic indicator, the channel traffic logic may determine whether to disable the low rate preamble detector.

Further embodiments comprise logic to design or select a station for a particular application based upon, parameters related channel traffic. Some embodiments, for example, may comprise code to design a station, or a portion thereof, based upon requirements of IEEE 802.11 standards such as IEEE 802.11-2007, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2007.pdf).

Some embodiments to design or select a station may comprise a medium containing instructions to cause a machine to perform operations to design an IEEE 802.11 station, wherein the operations comprise determining whether to integrate a low rate preamble detector into the design of the IEEE 802.11 station such as an IEEE 802.11ah station based upon a duty cycle for which the IEEE 802.11 station is designed to support. Some embodiments to design a station may comprise a medium containing instructions to cause a machine to perform operations to design an IEEE 802.11 station, wherein the operations comprise determining whether to integrate a low rate preamble detector into the design of the IEEE 802.11 station based upon a size of a buffer for data to transmit by a transmitter of the IEEE 802.11 station. Some embodiments to design a station may comprise a medium containing instructions to cause a machine to perform operations to design an IEEE 802.11 station, wherein the operations comprise determining whether to integrate a low rate preamble detector into the design of the IEEE 802.11 station based upon a size of a buffer for data to receive by a receiver of the IEEE 802.11 station. And some embodiments to design a station may comprise a medium containing instructions to cause a machine to perform operations to design an IEEE 802.11 station, wherein the operations comprise determining whether to integrate a low rate preamble detector into the design of the IEEE 802.11 station based upon a channel occupancy of a channel on which the IEEE 802.11 station is designed to communicate.

Some embodiments implement extended range systems and stations for, e.g., IEEE 802.11ah systems. In many embodiments, the normal range stations may implement a first set of modulation and coding schemes and the extended range stations may implement a second set of modulation and coding schemes at low physical layer data rates that are lower than the data rates of the first set of modulation and coding schemes for the normal range stations. In further embodiments, the extended range stations may implement a different (long) preamble, creating a situation in which normal rate stations and low rate stations may generate communications with different preambles and different data rates. As a result, stations may have two different preambles at two different data rates to detect and decode and some of these stations may require two different detectors, a normal rate preamble detector and a low rate preamble detector to detect and decode the preambles of the communications signals.

The use of two different detectors, a low rate preamble detector and a normal rate preamble detector, may increase the silicon area utilized by the circuitry for the detectors, the costs of such stations, and the power consumed by use of both detectors, e.g., in parallel. Many embodiments focus on reducing power consumption for stations that incorporate both the normal rate preamble detectors and low rate preamble detectors by determining when to disable the low rate preamble detectors and place the low rate preamble detectors in a reduced power consumption state or mode. Other embodiments focus on code to design or select stations for particular applications, determining whether the stations require the low rate preamble detector to operate appropriately such as in conformance operations of IEEE 802.11ah stations.

Some embodiments may take advantage of Wireless Fidelity (Wi-Fi) network ubiquity, enabling new applications that often require very low power consumption, among other unique characteristics. Wi-Fi generally refers to devices that implement the IEEE 802.11-2007, and other related wireless standards.

Several embodiments comprise access points (APs) for and/or client devices of APs or stations (STAs) such as routers, switches, servers, workstations, netbooks, mobile devices (Laptop, Smart Phone, Tablet, and the like), as well as sensors, meters, controls, instruments, monitors, appliances, and the like. Some embodiments may provide, e.g., indoor and/or outdoor "smart" grid and sensor services. For example, some embodiments may provide a metering station to collect data from sensors that meter the usage of electricity, water, gas, and/or other utilities for a home or homes within a particular area and wirelessly transmit the usage of these services to a meter substation. Further embodiments may collect data from sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services may require much lower data rates and much lower (ultra low) power consumption than devices provided in IEEE 802.11n/ac systems.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Figure 1:
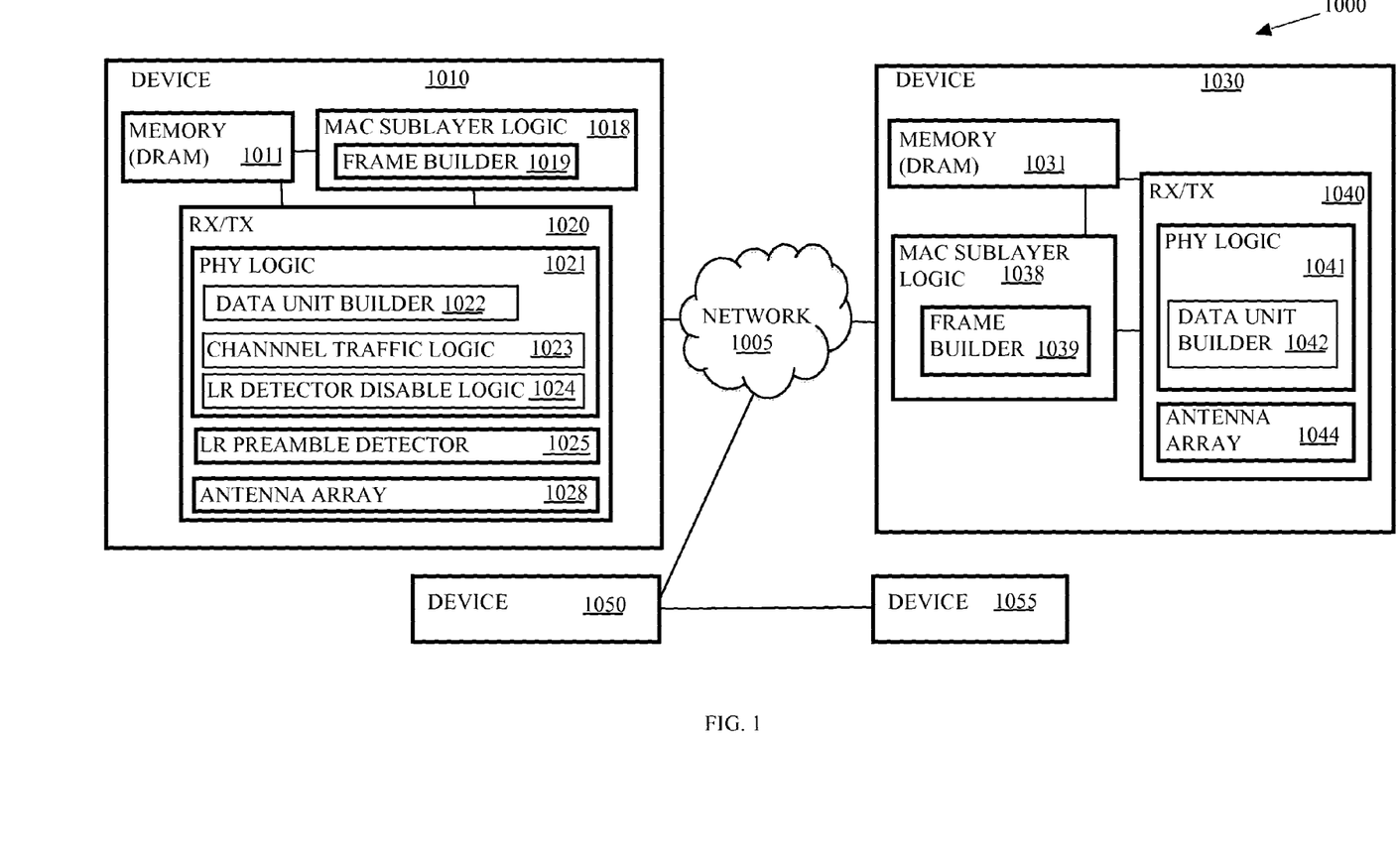
FIG. 1 depicts an embodiment of a wireless network comprising a plurality of communications devices, including multiple fixed or mobile communications devices.

Turning now to FIG. 1, there is shown an embodiment of a wireless communication system 1000. The wireless communication system 1000 comprises a communications device 1010 that is wire line or wirelessly connected to a network 1005. The communications device 1010 may communicate wirelessly with a plurality of communication devices 1030, and 1050 via the network 1005. The communications devices 1010, 1030, and 1050, and 1055 may comprise a sensor, a station, an access point, a hub, a switch, a router, a computer, a laptop, a notebook, a cellular phone, a PDA (Personal Digital Assistant), or another wireless-capable device. Thus, communications devices may be mobile or fixed. For example, the communications device 1010 may comprise a metering substation for water consumption within a neighborhood of homes. Each of the homes within the neighborhood may comprise a communications device such as the communications device 1030 and the communications device 1030 may be integrated with or coupled to a water meter usage meter. Periodically, the communications device 1030 may initiate communications with the metering substation to transmit data related to water usage. Furthermore, the metering station or other communications device may periodically initiate communications with the communications device 1030 to, e.g., update firmware of the communications device 1030. In other embodiments, the communications device 1030 may only respond to communications and may not comprise logic that initiates communications.

The communications device 1010 may periodically maintain high duty cycle traffic or very high duty-cycle traffic (e.g., a large file transfer or video streaming) due to the number of stations associated with the communications device 1010. After a period of time, the channel traffic may reduce and the channel traffic logic 1023 may determine that the traffic indicator has dropped below a threshold channel traffic value. Once the traffic indicator falls below the threshold channel traffic value, the probability of transmission collisions and/or the impact of the collisions on the communications traffic may be at or below a threshold that makes the value of utilizing the low rate preamble detector 1025 to detect low rate preamble traffic less valuable than the value of saving the power consumption by disabling part or all of the low rate preamble detector via a low rate detector disable logic 1024. Note that the point at which the value of power savings exceeds the value of avoiding collisions by using the low rate preamble detector may vary based upon the application. In other words, system specific and application specific considerations could tip the balance or move the threshold higher or lower. For example, power savings may be more valuable in situations in which the power supply of the communications device 1010 is limited such as when the communications device 1010 is powered exclusively by battery power or when the communications device 1010 is being powered by a battery due to a failure of a normal power supply. Some embodiments that can detect the failure of the normal power supply or the use of battery power, a different set of threshold channel traffic values may apply when on battery power than the set used when the station is powered by the normal power supply.

In further embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055. Communications device 1050 may be a second metering substation for receiving data in an adjacent geographical area and transmitting the data to the communications device 1010.

The communication devices 1010 and 1030 comprise memory 1011 and 1031, medium access control (MAC) sublayer logic 1018 and 1038, and physical layer (PHY) logic 1021 and 1041, respectively. The memory 1011, 1031 such as dynamic random access memory (DRAM), buffers, registers, cache, hard disk drives, solid state drives, optical media, or the like, may store the frames, preambles, and preamble structures, or portions thereof. In many embodiments, the memory 1011 may also store code representing channel traffic logic 1023 or a portion thereof and one or more thresholds related to determining a balance between saving power and utilizing a low rate preamble detector 1025 to detect and decode preambles of low rate traffic. The memory 1011 may also store one or more channel traffic threshold values. The frames, also referred to as MAC layer Protocol Data Units (MPDUs), and the preamble structures may comprise long preamble structures for low rate communications and short preamble structures for normal rate communications and may establish and maintain synchronized communications between the transmitting device and the receiving device.

The MAC sublayer logic 1018, 1038 may generate the frames and PHY logic 1021, 1041 may generate physical layer data units (PPDUs). More specifically, the frame builders 1012 and 1032 may generate frames and data unit builders 1022, 1042 to generate PPDUs. For instance, the communications device 1030 may be integrated with a sensor that makes measurements of the environment in the vicinity of the communications device 1030 and may transmit a packet including data related to the measurements to communications device 1010. The communications device 1010 may monitor the channel traffic with an energy detector coupled with a normal rate preamble detector and a low rate preamble detector 1025 in parallel to detect and decode the communications signal from the communications device 1030.

The communications devices 1010, 1030, 1050, and 1055 may each comprise a transceiver (RX/TX) such as transceivers (RX/TX) 1020 and 1040. Each transceiver 1020, 1040 comprises an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom. FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system.

The transceivers (RX/TX) 1020 and 1040 may comprise physical (PHY) layer logic 1021 and 1041, respectively. The physical (PHY) layer logic 1021, 1041 may comprise data as well as channel traffic logic 1023 to determine traffic indicator values such as channel occupancy and duty cycle as well as low rate disable logic to transmit one or more signals to disable the low rate detector 1025. In some embodiments, the PHY logic 1021 may comprise logic to receive and detect normal rate preambles and low rate preamble detector logic to receive and detect low rate preambles. The low rate preamble detector 1025 in the present embodiment comprises both code and circuitry to detect and decode low rate preambles. In other embodiments, the low rate preamble detector 1025 may comprise circuitry to detect and decode low rate preambles.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. Guard tones may be inserted between symbols such as the STF and LTF symbols during transmission to avoid inter-symbol interference (ISI), which might result from multi-path distortion. These guard tones also help the signal conform to a spectral mask. The nulling of the direct component (DC) may be used to simplify direct conversion receiver designs.

In one embodiment, the communications device 1010 optionally comprises a digital beam former (DBF). The DBF transforms information signals into signals to be applied to elements of an antenna array 1024. The antenna array 1024 is an array of individual, separately excitable antenna elements. The signals applied to the elements of the antenna array 1024 cause the antenna array 1024 to radiate, e.g., one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and, optionally, a DBF.

Figure 2:
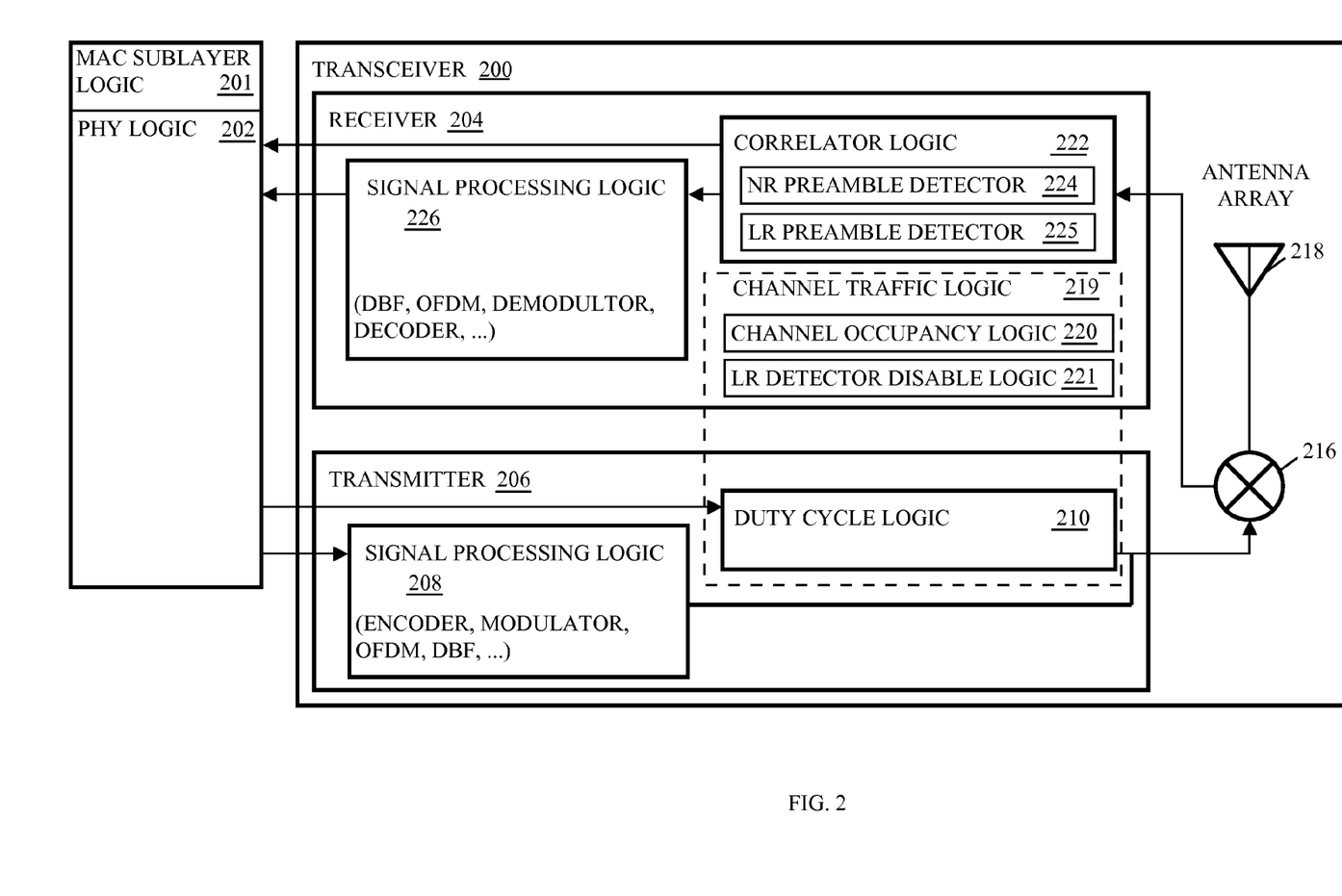
FIG. 2 depicts an embodiment of an apparatus to transmit and receive normal rate and low rate communications.

FIG. 2 illustrates an embodiment of an apparatus to detect and decode normal rate preambles and low rate preambles in communication signals in a wireless network. The apparatus comprises a transceiver 200 coupled with medium access control (MAC) sublayer logic 201 and physical layer (PHY) logic 202. In general, the MAC sublayer logic 201 may generate a MAC service data unit (MSDU) to transmit via transceiver 200 and the PHY logic 202 may generate a PHY protocol data unit (PPDU) to transmit via antenna array 218.

The transceiver 200 comprises a receiver 204 and a transmitter 206. The transmitter 206 may comprise signal processing logic 206 and duty cycle logic 210. The signal processing logic 208 comprises circuitry for processing packets such as a physical layer protocol data unit (PPDU) for transmission via the antenna array 218. The signal processing logic 206 may comprise one or more of an encoder, a modulator, an orthogonal frequency division multiplexer (OFDM), a digital beam former (DBF) and/or other signal processing units. The encoder may receive data destined for transmission from the PHY logic 202. The modulator may receive data from the encoder to transform each block of binary data received from encoder into a unique continuous-time waveform that can be transmitted by an antenna element of the antenna array 218 upon up-conversion and amplification. The output of modulator may be fed to an OFDM to impress the modulated data from modulator onto a plurality of orthogonal sub-carriers. And the output of the OFDM may be fed to the DBF to use digital signal processing algorithms that operate on the signals received by, and transmitted from, an array of antenna elements to steer a plurality of spatial channels independently to maximize the signal power transmitted to and received from each of a plurality of user terminals.

The duty cycle logic 210 may comprise part of channel traffic logic 219 and may couple with the MAC sublayer logic 201 and/or signal processing logic 208 to determine a duty cycle of transmissions generated by transmitter 206. The duty cycle logic 210 may determine the time that the transmitter 206 spends in an active state, transmitting packets, as a fraction of a total period of time. In many embodiments, the duty cycle logic 210 may determine a duty cycle value and the duty cycle value may be a channel traffic indicator that is compared against a threshold channel traffic value such as a threshold duty cycle value to determine whether the traffic generated by the transmitter 206 indicates that the low rate (LR) preamble detector 225 should be in an active state to monitor the channel for low rate channel traffic. In several embodiments, the threshold duty cycle value or channel traffic indicator may comprise a threshold range having a lower value indicative of a channel traffic level at which the LR preamble detector 225 will be disabled and a higher value indicative of a channel traffic level at which the LR preamble detector 225 will be enabled. In other embodiments, other forms of hysteresis methods are implemented such as time delays.

In many embodiments, the duty cycle logic 210 may couple with the MAC sublayer logic 201 in parallel with the signal processing logic 208. In several embodiments, the duty cycle logic 210 may couple with the antenna array 218 in parallel with the signal processing logic 208. In other embodiments, the duty cycle logic 210 may couple with the antenna array 218 in series with the signal processing logic 208. In further embodiments, the duty cycle logic 210 may couple with the antenna array 218 in series with at least a portion of the signal processing logic 208.

The transceiver 200 may also comprise diplexers 216 connected to antenna array 218. Thus, in this embodiment, a single antenna array is used for both transmission and reception. When transmitting, the signal passes through diplexers 216 and drives the antenna with the up-converted information-bearing signal. During transmission, the diplexers 216 prevent the signals to be transmitted from entering receiver 204. When receiving, information bearing signals received by the antenna array pass through diplexers 216 to deliver the signal from the antenna array to receiver 204. The diplexers 216 then prevent the received signals from entering transmitter 206. Thus, diplexers 216 operate as switches to alternately connect the antenna array elements to the receiver 204 and the transmitter 206.

Antenna array 218 radiates the information bearing signals into a time-varying, spatial distribution of electromagnetic energy that can be received by an antenna of a receiver. The receiver can then extract the information of the received signal. An array of antenna elements can produce multiple spatial channels that can be steered to optimize system performance. Reciprocally, multiple spatial channels in the radiation pattern at a receive antenna can be separated into different spatial channels. Thus, a radiation pattern of antenna array 218 may be highly selective. The antenna array 218 may be implemented using existing printed circuit board metallization technology. Microstrips, striplines, slotlines, and patches, for example, are all candidates for the antenna array 218.

The transceiver 200 may comprise a receiver 204 for receiving, demodulating, and decoding information bearing communication signals. The receiver 204 may comprise a physical layer logic including correlator logic 222 and signal processing logic 226. The correlator logic 222 may correlate preamble symbols with known preamble symbols such as short training sequences and long training sequences. In the present embodiment, the correlator logic 222 may comprise normal rate (NR) preamble logic 224 to compare the received normal rate symbols with known short preamble sequences at a data rate of a first set of modulation and coding schemes implemented by normal rate stations as well as the LR preamble logic 225 to compare the received low rate symbols with known long preamble sequences at a data rate of a second set of modulation and coding schemes implemented by low rate stations.

To illustrate, the correlation logic 224 may receive energy from the antenna array 218 and direct the energy to the NR preamble logic 224 and the LR preamble logic 225 in parallel. The NR preamble detector 224 may detect and decode the training symbols in normal rate communications signals and the LR preamble logic 225 may detect and decode training symbols in low rate communications signals to determine the existence of the communication signals on the channel. For situations in which the LR preamble detector 225 is disabled, the LR preamble detector 225 may be in a reduced power consumption state and may not operate to detect and decode preambles of the low rate communication signals. In such situations, the NR preamble detector 225 may sense the energy of the low rate communication signals to determine the existence of the low rate communications on the channel. In further embodiments, the LR preamble detector 225 may be able to detect energy but not decode the preamble of the low rate communication signals while the LR preamble detector 225 is disabled. For instance, disabling the LR preamble detector 225 may disable, remove power from, reduce power to, or otherwise place the decode circuitry of the LR preamble detector 225 in an inactive state or mode. In other embodiments, the detection circuitry of the LR preamble detector 225 may be disabled.

In some embodiments, the correlator logic 222 may couple in series with the signal processing logic 226 and the antenna array 218. In further embodiments, the correlator logic 222 may couple in parallel with the signal processing logic 226. In other embodiments, the correlator logic 222 may operate partially in parallel with the signal processing logic 226.

In the present embodiment, the transceiver 200 comprises channel traffic logic 219. The channel traffic logic 219 may determine one or more traffic indicators such as a channel occupancy value by channel occupancy logic 220 and a duty cycle value by duty cycle logic 221. In further embodiments, other channel traffic indicators may be determined.

The channel traffic logic 219 may compare the one or more traffic indicators against threshold values for the traffic indicators to determine whether the LR preamble detector 225 will remain in the active state or will be disabled or deactivated via the low rate detector disable logic 221. In some embodiments, the channel traffic logic 219 may only use a duty cycle value, only use a channel occupancy indicator, or only use another traffic indicator to determine whether to disable or enable the LR preamble detector 225. In several embodiments, the channel traffic logic 219 may determine to disable or enable the LR preamble detector 225 based upon any one of the traffic indicators meeting or exceeding a threshold channel traffic value. For example, if the duty cycle increases to a value above the threshold duty cycle value or the channel occupancy value increases above the threshold channel occupancy value then the LR preamble detector 225 may be enabled or, in some embodiments, awoken from a reduced power consumption state.

In further embodiments, more than one traffic indicators may be combined to determine whether the traffic indicators attain a threshold channel traffic value. For example, in one embodiment, the duty cycle value and the channel occupancy value may be combined via a weighted function to determine a single traffic indicator value and the single traffic indicator value may be compared against a threshold channel traffic value.

The channel occupancy logic 220 may determine a channel occupancy value based upon energy detection and/or preamble detection for communication signals in the communications channel. For example, when the LR preamble detector 225 is enabled, the channel occupancy logic 220 may determine the channel occupancy based upon preamble detection by the NR preamble detector 224 and the LR preamble detector 225. For situations in which the LR preamble detector 225 is disabled, the channel occupancy logic 220 may determine the channel occupancy based upon preamble detection by the NR preamble detector 224 for normal rate communication signals and energy detection by NR preamble detector 224 or by the LR preamble detector 225 of the receiver 204 for low rate communication signals.

The low rate (LR) detector disable logic 221 may disable the LR preamble detector 225 in response to an indication from the channel traffic logic 219 to disable the LR preamble detector 225 and may enable the LR preamble detector 225 in response to an indication from the channel traffic logic 219 to enable the LR preamble detector 225. In some embodiments, the LR detector disable logic 221 may disable the LR preamble detector 225 by reducing or removing power from circuitry of the LR preamble detector 225, or portions thereof. In further embodiments, the LR preamble detector 225 may be disabled by disconnecting the energy input from the antenna array 218 from the input of the LR preamble detector 225. In further embodiments, the LR preamble detector 225 may be disabled by other means.

The LR detector disable logic 221 may enable the LR preamble detector by increasing or applying power to circuitry of the LR preamble detector 225, or portions thereof. In further embodiments, connecting the energy input from the antenna array 218 to the input of the LR preamble detector 225 may enable the LR preamble detector 225. In further embodiments, the LR preamble detector 225 may be enabled by other means.

In some embodiments, the signal processing logic 226 may comprise one or more of a DBF, an OFDM, a demodulator and a decoder. The received signals are fed from antenna elements 218 to a DBF. The DBF transforms N antenna signals into L information signals. The output of the DBF is fed to the OFDM. The OFDM extracts signal information from the plurality of subcarriers onto which information-bearing signals are modulated. The demodulator demodulates the received signal. And, the decoder decodes the received data from the demodulator and transmits the decoded information, the MPDU, to the MAC sublayer logic 201.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), cache, buffers, registers, a reference oscillator, filtering circuitry, synchronization circuitry, possibly multiple frequency conversion stages and multiple amplification stages, etc. Further, some of the functions shown in FIG. 2 may be integrated. For example, digital beam forming may be integrated with orthogonal frequency division multiplexing. The DRAM, cache, buffers, and registers may couple with any component for storing and manipulating data to accomplish data processing discussed herein.

Figure 3:
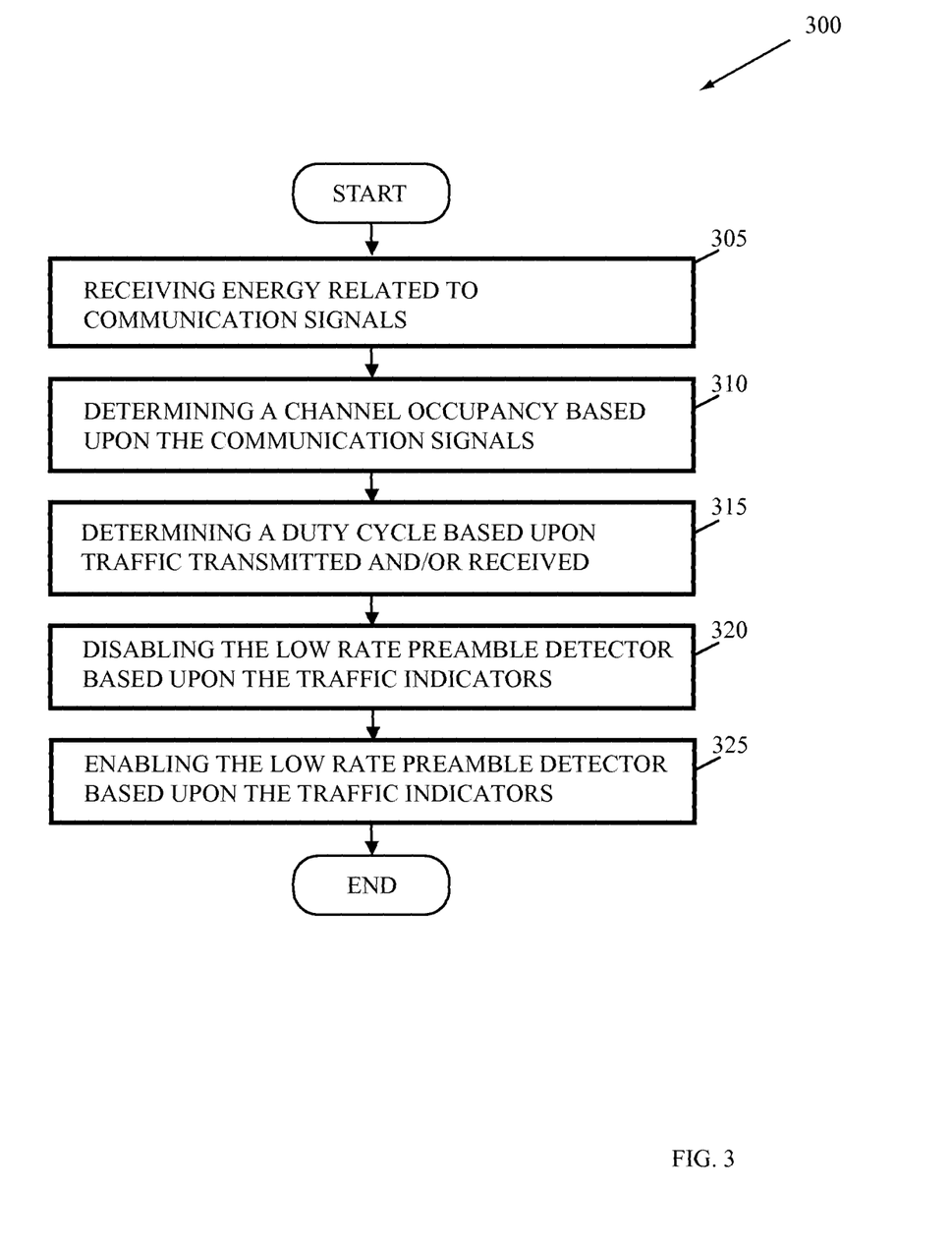
FIG. 3 depicts an embodiment of a flowchart to disable and enable a low rate preamble detector.

FIG. 3 depicts an embodiment of a flowchart 300 to disable and enable a low rate preamble detector. The flowchart 300 begins with a receiver receiving a communication signal via an antenna or antenna array at correlator logic (element 305). The correlator logic may comprise a normal rate preamble detector and a low rate preamble detector to detect and decode preambles for normal rate and low rate communication signals.

Channel traffic logic may be communicatively coupled with the normal rate and low rate preamble detectors to determine a channel occupancy value based upon the communication signals (element 310). The channel occupancy logic may determine the channel occupancy value based upon the detected and decoded preambles of communication signals on the communications channel. In some embodiments, the channel occupancy value may be indicative of the percentage of time that communication signals are being transmitted on the communications channel. In further embodiments, the channel occupancy value may comprise a count of communication signals detected over a period of time. In other embodiments, the channel occupancy value may comprise other values indicative of channel traffic.

In many embodiments, the channel traffic logic may determine a duty cycle based upon traffic transmitted and/or received by the station within which the channel traffic logic resides (element 315). In some embodiments, the duty cycle logic may determine the duty cycle value based upon the detected and decoded preambles of communication signals on the communications channel. In some embodiments, the duty cycle value may be indicative of the percentage of time that communication signals are being transmitted and or received by the station within which the channel traffic logic resides. In further embodiments, the duty cycle value may comprise a count of communication signals transmitted and/or received over a period of time. In other embodiments, the duty cycle value may comprise other values indicative of channel traffic being transmitted from or received by the station.

After determining one or more traffic indicators, the channel traffic logic may disable the low rate preamble detector based upon the one or more traffic indicators (element 320). For example, the channel traffic logic may compare traffic indicators as the indicators are determined against threshold values for such indicators to determine whether to enable or disable the low rate preamble detector. In many embodiments, some sort of hysteresis process may be implemented such as waiting a period of time after changing the state of the low rate preamble detector before implementing another change to the state of the low rate preamble detector. In some embodiments, the low rate preamble detector may be disabled by user configurable preferences. For instance, if the user determines that the application for which the station will be installed will have a low channel occupancy or a low duty cycle, the user may determine to set the preference to permanently disable the low rate preamble detector until the preference is manually changed by the user. In such embodiments, the logic to disable and enable the low rate preamble detector may also be disabled.

While the low rate preamble detector is disabled, the channel occupancy and/or the duty cycle values may be compared against threshold channel traffic values to determine whether to enable the low rate preamble detector. In response to a traffic indicator reaching or surpassing a threshold channel traffic value, the low rate preamble detector may be enabled (element 325). In other embodiments, the threshold channel traffic values for traffic indicators such as the threshold channel occupancy value(s) and the threshold duty cycle value(s) may be stored in a storage medium such as a read only memory, random access memory, a cache, a buffer, a register, or the like. In further embodiments, one or more of the threshold values may be hard-coded into the MAC sublayer logic, PHY logic, or may otherwise be available to the channel traffic logic.

Figure 4:
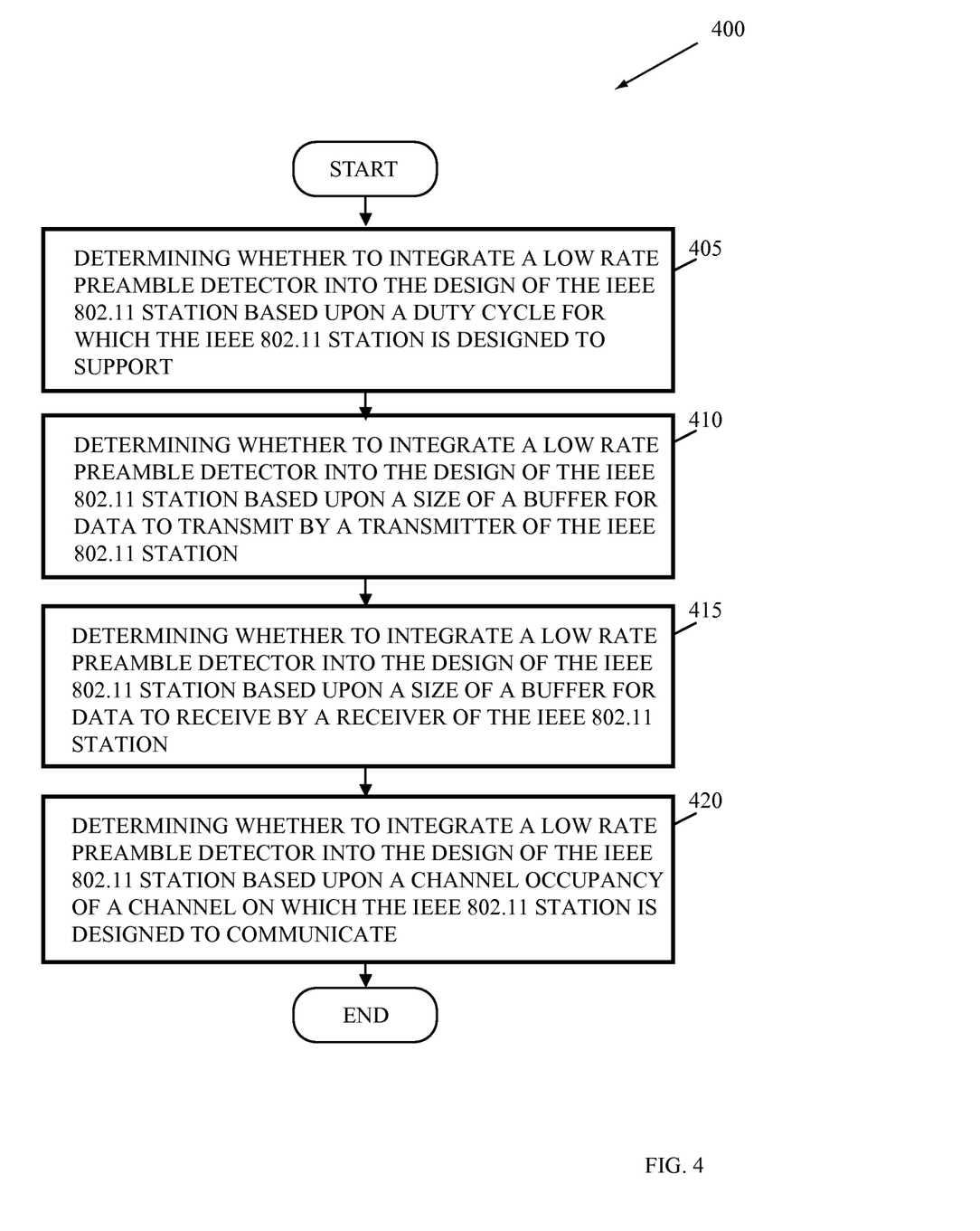
FIG. 4 depicts an embodiment of a flowchart to design an IEEE 802.11 station such as a station illustrated in FIG. 1.

FIG. 4 depicts an embodiment of a flowchart 400 to design an IEEE 802.11 station such as a station illustrated in FIG. 1 either for the purposes of fabricating the station or for the purposes of selecting an appropriate station for a particular application as defined by the input parameters. Using two different sets of modulation and coding schemes and two different preambles in a network cause stations that do not support the low rate communications to require implementation of a low rate preamble detector and decoder such as the low rate preamble detector 225 in FIG. 2 in order to defer transmission properly when the channel is occupied by a packet transmitted at the low rate modulation and coding schemes. This increases the cost for the devices such as sensors that do not need to support the low rate the low rate modulation and coding schemes. However, when duty cycles of stations are low, there is very little chance for the normal rate modulation and coding scheme packets and the low rate modulation and coding scheme packets to overlap with each other. Collisions are more probable when a device that supports only the normal rate modulation and coding scheme packets has a high or very high duty cycle traffic. Thus, code for designing at least a portion of a station or for selecting a station for a particular application may be executed to determine whether the low rate preamble detector should be integrated into the circuitry of the correlator logic of the receiver in a station.

According to one embodiment, the low rate preamble detector may be integrated in a normal rate station based on the traffic supported by the normal rate station. A normal rate station that only supports, e.g., i) low duty-cycle traffic or ii) small transmit/receive buffer size or iii) low channel occupancy (e.g. packet transmission every few minutes or longer) may optionally integrate a low rate preamble detector for carrier sensing. A normal rate station that supports, e.g., i) high duty-cycle traffic or ii) large transmit/receive buffer size, or iii) high channel occupancy such as full-buffered traffic or back-to-back transmission may be required to integrate a low rate preamble detector for carrier sensing by, e.g., an IEEE 802.11 standard.

The flowchart 400 may begin with determining whether to integrate a low rate preamble detector into the design of the IEEE 802.11 station based upon a duty cycle for which the IEEE 802.11 station is designed to support (element 405). A normal rate station with a duty cycle that exceeds a first threshold channel traffic value may require a low rate preamble detector to conform with an IEEE 802.11 standard. A normal rate station with a duty cycle that exceeds a second, lower traffic threshold channel traffic value may preferably but optionally include a low rate preamble detector. And a normal rate station with a duty cycle that is below the threshold channel traffic values may optionally include a low rate preamble detector. Some embodiments may employ a growth indicator such as the possibility of growth of the network based upon information about the intended use for the station. In such embodiments, a duty cycle is projected based upon the growth factor and if the projected duty cycle exceeds the threshold channel traffic value, the low rate preamble detector may be recommended. Further embodiments may recommend the low rate preamble detector if the duty cycle is within a percentage of the threshold channel traffic value.

The flowchart 400 continues with determining whether to integrate a low rate preamble detector into the design of the IEEE 802.11 station based upon a size of a buffer for data to transmit by a transmitter of the IEEE 802.11 station (element 410) and determining whether to integrate a low rate preamble detector into the design of the IEEE 802.11 station based upon a size of a buffer for data to receive by a receiver of the IEEE 802.11 station (element 415). The buffer size of the transmitter and/or receiver may be related to the amount of communications traffic that the normal rate station can handle and/or is expected to handle. Thus, some embodiments may consider that stations with buffer(s) that are smaller than a certain size may not need low rate preamble detectors. Conversely, if the buffer(s) are larger than a certain size, the normal rate station may be capable of sufficiently high communications traffic to recommend the integration of a low rate preamble detector or to make such integration mandatory to conform to an IEEE 802.11 standard.

The flowchart 400 may further continue with determining whether to integrate a low rate preamble detector into the design of the IEEE 802.11 station based upon a channel occupancy of a channel on which the IEEE 802.11 station is designed to communicate (element 420). In some embodiments, the channel occupancy may be determined based upon an anticipated channel occupancy entered by a user or by a typical channel occupancy range based upon the application for which the station is intended.

Another embodiment is implemented as a program product for implementing systems and methods described with reference to FIGS. 1-4. Some embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product (or machine-accessible product) accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product.

It will be apparent to those skilled in the art having the benefit of this disclosure that the present disclosure contemplates methods and arrangements for channel access. It is understood that the form of the embodiments shown and described in the detailed description and the drawings are to be taken merely as examples. It is intended that the following claims be interpreted broadly to embrace all variations of the example embodiments disclosed.

What is claimed is:

1. A method comprising:
   receiving, by a station, energy related to communication signals by a normal rate preamble detector and by a low rate preamble detector in parallel;
   determining, by a channel traffic logic of the station, traffic indicator values for a communications channel, the traffic indicator values comprising a channel occupancy value being indicative of an amount of traffic on the communications channel over a period of time, a duty cycle being indicative of a time that the station is in an active state, and a buffer size being indicative of an amount of data to be transmitted/received;
   disabling, by the station, the low rate preamble detector based upon the traffic indicator values, wherein disabling the low rate preamble detector is in response to determining that the traffic indicator values are below a threshold channel traffic value related to determining a balance between saving power and utilizing the low rate preamble detector; and
   enabling, by the station, the low rate preamble detector based upon the traffic indicator values, wherein enabling the low rate preamble detector is in response to determining that the traffic indicator values are above the threshold channel traffic value.

2. The method of claim 1, further comprising receiving, by an antenna, the energy related to communications signals and transmitting the energy to the normal rate preamble detector and the low rate preamble detector.

3. The method of claim 1, further comprising storing, by the normal rate preamble detector, at least part of a preamble in memory based upon the energy related to the communication signals.

4. The method of claim 1, wherein determining, by the channel traffic logic, a traffic indicator for the communications channel comprises determining the duty cycle.

5. The method of claim 1, wherein disabling the low rate preamble detector comprises comparing, by the channel traffic logic, the traffic indicator against a threshold channel traffic value.

6. The method of claim 1, wherein disabling the low rate preamble detector comprises comparing, by the channel traffic logic, the traffic indicator against a threshold channel traffic value to determine whether to disable the low rate preamble detector.

7. The method of claim 1, wherein disabling the low rate preamble detector comprises comparing, by the channel traffic logic, the traffic indicator, the traffic indicator being a channel occupancy indicator, against a threshold channel traffic value to determine whether to disable the low rate preamble detector.

8. The method of claim 1, wherein disabling the low rate preamble detector comprises placing the low rate preamble detector in a reduced power consumption state.

9. A device comprising:
   a normal rate preamble detector comprising circuitry to receive energy related to communication signals;
   a low rate preamble detector comprising circuitry to receive the energy related to communication signals in parallel with receipt of the energy by the normal rate preamble detector; and
   a channel traffic logic comprising circuitry to:
      determine traffic indicator values for a communications channel, the traffic indicator values comprising a channel occupancy value being indicative of an amount of traffic on the communications channel over a period of time, a duty cycle being indicative of a time that the station is in an active state, and a buffer size being indicative of an amount of data to be transmitted/received;
      disable the low rate preamble detector based upon the traffic indicator values, wherein disablement of the low rate preamble detector is in response to a determination that the traffic indicator values are below a threshold channel traffic value related to determining a balance between saving power and utilizing the low rate preamble detector; and
      enable the low rate preamble detector based upon the traffic indicator values, wherein enablement of the low rate preamble detector is in response to determining that the traffic indicator values are above the threshold channel traffic value.

10. The device of claim 9, further comprising an antenna to receive the energy related to communications signals and to transmit the energy to the normal rate preamble detector and the low rate preamble detector.

11. The device of claim 9, further comprising memory to store at least part of a preamble in memory based upon the energy related to the communication signals received by the normal rate preamble detector.

12. The device of claim 9, wherein the channel traffic logic comprises logic to determine the duty cycle.

13. The device of claim 9, wherein the channel traffic logic comprises logic to compare the traffic indicator against a threshold channel traffic value to determine whether to disable the low rate preamble detector.

14. The device of claim 13, wherein the logic to compare the traffic indicator against a threshold channel traffic value comprises logic to compare the duty cycle against the threshold duty cycle value.

15. The device of claim 13, wherein the logic to compare the traffic indicator against a threshold channel traffic value comprises logic to compare a channel occupancy against a threshold channel occupancy.

16. The device of claim 9, wherein the channel traffic logic to disable the low rate preamble detector comprises logic to place the low rate preamble detector in a reduced power consumption state.

17. A system comprising:
an antenna;
a normal rate preamble detector coupled with the antenna to receive energy related to communication signals;
a low rate preamble detector coupled with the antenna to receive the energy related to communication signals in parallel with receipt of the energy by the normal rate preamble detector; and
a channel traffic logic comprising circuitry to:
determine traffic indicator values for a communications channel, the traffic indicator values comprising a channel occupancy value being indicative of an amount of traffic on the communications channel over a period of time, a duty cycle being indicative of a time that the station is in an active state, and a buffer size being indicative of an amount of data to be transmitted/received;
disable the low rate preamble detector based upon the traffic indicator values, wherein disablement of the low rate preamble detector is in response to a determination that the traffic indicator values are below a threshold channel traffic value related to determining a balance between saving power and utilizing the low rate preamble detector; and
enable the low rate preamble detector based upon the traffic indicator values, wherein enablement of the low rate preamble detector is in response to determining that the single traffic indicator values are above the threshold channel traffic value.

18. The system of claim 17, further comprising memory to store at least part of a preamble in memory based upon the energy related to the communication signals received by the normal rate preamble detector.

19. The system of claim 17, wherein the channel traffic logic comprises logic to determine the duty cycle.

20. The system of claim 17, wherein the channel traffic logic comprises logic to compare the traffic indicator against a threshold channel traffic value to determine whether to disable the low rate preamble detector.

21. The system of claim 20, wherein the logic to compare the traffic indicator against a threshold channel traffic value comprises logic to compare the duty cycle against the threshold duty cycle value.

22. The system of claim 20, wherein the logic to compare the traffic indicator against a threshold channel traffic value comprises logic to compare a channel occupancy against a threshold channel occupancy.

23. The system of claim 17, wherein the channel traffic logic to disable the low rate preamble detector comprises logic to place the low rate preamble detector in a reduced power consumption state.

24. A machine-accessible product comprising:
a non-transitory medium containing instructions to be executed by a processor of a station to cause the processor to perform operations, wherein the operations comprise:
determining traffic indicator values for a communications channel, the traffic indicator values comprising a channel occupancy value being indicative of an amount of traffic on the communications channel over a period of time, a duty cycle being indicative of a time that the station is in an active state, and a buffer size being indicative of an amount of data to be transmitted/received while a low rate preamble detector and a normal rate preamble detector receive energy related to communication signals in parallel;
disabling the low rate preamble detector based upon the traffic indicator values, wherein disabling the low rate preamble detector is in response to determining that the traffic indicator values are below a threshold channel traffic value related to determining a balance between saving power and utilizing the low rate preamble detector; and
enabling the low rate preamble detector based upon the traffic indicator values, wherein enablement of the low rate preamble detector is in response to determining that the traffic indicator values are above the threshold channel traffic value.

25. A machine-accessible product comprising:
a non-transitory medium containing instructions to be executed by a processor to cause the processor to perform operations to design or select an IEEE 802.11 station, wherein the operations comprise:
determining, for the IEEE 802.11 station, traffic indicator values for normal rate data communications that the IEEE 802.11 station is designed to support, the traffic indicator values comprising a channel occupancy value being indicative of an amount of traffic on the communications channel over a period of time, a duty cycle being indicative of a time that the station is in an active state, and a buffer size being indicative of an amount of data to be transmitted/received;
integrating a low rate preamble detector in the design of the IEEE 802.11 station or selecting the IEEE 802.11 station comprising a low rate preamble detector to receive energy related to communications in parallel with receipt of the energy by a normal rate detector if the IEEE 802.11 station is designed to support the traffic indicator values that exceeds a threshold channel traffic value related to determining a balance between saving power and utilizing the low rate preamble detector; and
determining not to integrate the low rate preamble detector into the design of the IEEE 802.11 station or selecting the IEEE 802.11 station without a low rate preamble detector in response to a determination that the traffic indicator values are below the threshold channel traffic value.

* * * * *